US008874668B2

(12) United States Patent
Eydelman et al.

(10) Patent No.: US 8,874,668 B2
(45) Date of Patent: Oct. 28, 2014

(54) DIRECTING MESSAGES BASED ON DOMAIN NAMES

(75) Inventors: Vadim Eydelman, Bellevue, WA (US); Sankaran Narayanan, Redmond, WA (US); Namendra Kumar, Redmond, WA (US); Bimal K. Mehta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 13/157,501

(22) Filed: Jun. 10, 2011

(65) Prior Publication Data

US 2012/0317207 A1    Dec. 13, 2012

(51) Int. Cl.
G06F 15/16 (2006.01)
H04L 29/12 (2006.01)

(52) U.S. Cl.
CPC .......... H04L 61/1511 (2013.01); H04L 61/609 (2013.01); H04L 61/1594 (2013.01)
USPC ............................ 709/206; 709/205; 709/207

(58) Field of Classification Search
USPC ........................................................ 709/206
See application file for complete search history.

(56) References Cited

U.S. PATENT DOCUMENTS

| 6,119,171 | A | 9/2000 | Alkhatib |
| 6,654,359 | B1 | 11/2003 | La Porta et al. |
| 7,120,120 | B2 | 10/2006 | Guerin et al. |
| 7,213,068 | B1 | 5/2007 | Kohli et a |
| 2002/0087707 | A1* | 7/2002 | Stewart et al. ............... 709/230 |
| 2005/0216567 | A1 | 9/2005 | Ruiz |
| 2006/0112170 | A1 | 5/2006 | Sirkin |
| 2009/0052434 | A1* | 2/2009 | Jackson ........................ 370/352 |
| 2010/0011048 | A1* | 1/2010 | Morris .......................... 709/201 |

OTHER PUBLICATIONS

"Understanding Active Directory Site-Based Routing," 24 pages, http://technet.microsoft.com/en-us/library/aa998825(EXCHG.80).aspx (Retrieved Date: Mar. 24, 2011).
"XIMS: How to Configure a Single Domain with Connected Sites via IMS," 5 pages, http://support.microsoft.com/kb/196927 (Retrieved Date:: Mar. 25, 2011).
Huston, G., "Commentary on Inter-Domain Routing in the Internet," pp. 1-25, http://tools.ietf.org/pdf/rfc3221.pdf (Dec. 2001).
Li, T. et al., "Tariff-Based Pricing and Admission Control for DiffServ Networks," *Integrated Network Management*, pp. 73-86, http://ieeexplore.ieee.org/stamp/stamp.jsp?tp=&arnumber=1194161 (Mar. 24-28, 2003).
Zhang, X. et al., "SCION: Scalability, Control, and Isolation on Next-Generation Networks,", 19 pages. http://repository.cmu.edu/cgi/viewcontent.cgi?article=1077&context=cylab&sei-redir=1#search=""Domain-Based+Routing"+and+mapping+table" (Dec. 28, 2010).
International Search Report issued Dec. 12, 2012 in PCT/US2012/040638 filed Jun. 3, 2012.

* cited by examiner

*Primary Examiner* — Shaq Taha
(74) *Attorney, Agent, or Firm* — Andrew Smith; Jim Ross; Micky Minhas

(57) ABSTRACT

A communication system has a plurality of collections. Each collection comprises a security boundary within which private data is accessible. Each collection is associated with a director. The directors receive messages that specify domains. When a director for a given collection receives a message, the director identifies one of the collections as being a home collection for the domain specified by the message. If the specified domain's home collection is the given collection or another collection within a given privacy boundary, the director forwards the message to a server pool associated with the specified domain's home collection. Otherwise, if the specified domain's home collection is not within the given privacy boundary, the director forwards the message to the director of the specified domain's home collection.

20 Claims, 9 Drawing Sheets

DIRECTING MESSAGES BASED ON DOMAIN NAMES

BACKGROUND

Some modern communication systems allow a user to communicate with other users even when the user moves to different locations around the world. For example, some communication systems allow the user to receive telephone calls regardless of whether the user is in China or in the United States.

To ensure that users can communicate regardless of their locations, the communication system can store a list that maps information identifying the users to Internet Protocol (IP) addresses of the user's communication devices. For example, the communication system can store a list that maps the usernames of the users to the IP addresses of the users' communication devices. However, if many users use the communication system, such lists can grow very large. Such large lists can decrease performance of the communication system.

Moreover, some countries have privacy regulations that consider data indicating a user's IP address to be private to the user. Accordingly, some countries prevent such data from being stored in jurisdictions that do not have protections on such data. Hence, communication systems that replicate the list at various locations around the world may violate such privacy regulations.

SUMMARY

A communication system helps computing devices establish communication sessions. The communication system stores data as a set of objects. The set of objects is divided into a plurality of collections. The collections can be grouped into privacy boundaries. Objects of each given collection are only accessible to computing devices associated with collections in the given collection's privacy boundary. This can help prevent unwanted distribution of private data. Each of the collections is associated with one or more domain names. One or more computing devices associated with each of the collections has access to a mapping from domain names to their associated collections.

Each collection is associated with a director. When a director of a collection receives a message that specifies a name of a domain, the director uses the mapping to determine the domain's collection. If the domain's collection and the director's collection are within the same privacy boundary, the director has access to objects that indicate a server pool that can process the message. Accordingly, the director forwards the message to this server pool. If the domain's collection and the director's collection are not within the same privacy boundary, the director does not have access to data that indicates the server pool that can process the message. Accordingly, the director forwards the message to the director of the domain's collection. The director of the domain's collection can then identify the server pool and forward the message to that server pool. In this way, the directors do not all need access to data that identifies the server pools.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

Embodiments help to establish communication by directing messages based on domain names specified in the messages. The following detailed description and the attached figures illustrate example embodiments. The reader will understand that other embodiments exist and are within the scope of the attached claims. In the attached figures, stacked blocks represent one or more similar, but not necessarily identical, items. In addition, ellipses between items represent one or more similar, by not necessarily identical, items. Items having the same reference numbers with different alphabetical suffixes (e.g., "A" through "N") are not intended to indicate the existence of a specific number of items.

Figure 1:
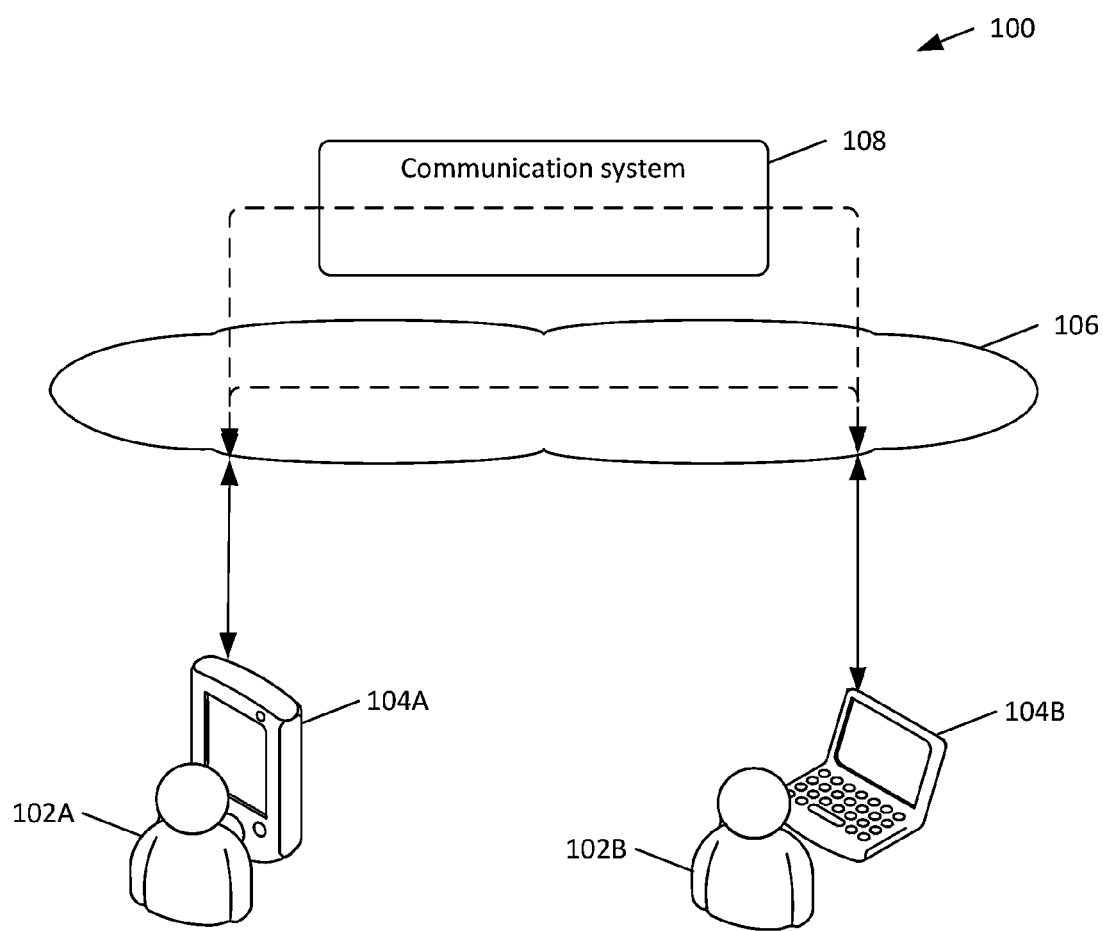
FIG. 1 illustrates an example system that enables communication between users.

FIG. 1 illustrates an example system 100 that enables communication between users 102A and 102B. This document refers to the users 102A and 102B collectively as the "users 102." In addition to the users 102, the system 100 includes communication devices 104A and 104B (collectively, "communication devices 104"), a network 106, and a communication system 108.

The users 102 are individual people. In various instances, the users 102 can be related in various ways. For example, the users 102 can be employees of the same company, employees of different companies, friends, family members, strangers, or have other relationships. In other embodiments, one of the users 102 is replaced by a software application, such as an Interactive Voice Response (IVR) system, designed to respond automatically to communications from people.

The communication devices 104 comprise one or more computing devices. In various embodiments, the communication devices 104 comprise various types of computing devices. In the example of FIG. 1, the communication device 104A is a smartphone and the communication device 104B is a laptop computer. In other embodiments, the communication devices 104 can comprise other types of computing devices. For example, the communication devices 104 can comprise personal computers, netbook computers, tablet computers, feature phones, landline telephones, television set-top boxes, network-enabled televisions, in-car computers, kiosks, public telephones, satellite phones, appliances, industrial or commercial equipment, video conferencing equipment, computer terminals, and/or other types of computing devices.

The network 106 facilitates communication among the communication devices 104 and the communication system 108. The network 106 comprises computing devices and communication links that communicate data between the computing devices. In various embodiments, the network 106 includes various types of computing devices and various types of communication links. Example types of computing devices in the network 106 include routers, switches, bridges, hubs, firewalls, intrusion detection devices, server devices, load balancers, mainframe computers, supercomputers, and so on. The communication links can include wired and/or wireless links. In various embodiments, the network 106 comprises various types of networks. For example, the network 106 can comprise one or more local area networks, wide area networks, metropolitan area networks, campus area networks, and networks implemented on other scales. In some embodiments, the network 106 comprises the Internet.

In some embodiments, the communication system 108 performs actions that help the communication devices 104 engage in real-time communication with one another. The communication system 108 comprises one or more computing devices. For example, the communication system 108 can comprise one or more personal computers, server computers, special purpose computers, blade servers, load balancers, mainframe computers, switches, routers, gateways, firewalls, supercomputers, and/or other types of computing devices.

In various embodiments, the communication system 108 performs actions that help the communication devices 104 engage in various types of real-time communication with one another. For example, the communication system 108 can perform actions that help the communication devices 104 engage in voice communication, video chatting, text messaging, instant messaging, desktop sharing, network meetings, conferencing, and/or other types of communication in which users perceive the conversation to be occurring in real time.

Users of the communication system 108 have usernames. The usernames comprise local names and domain names. For example, the user 102A can have a username "sandy@contoso.com" and the user 102B can have a username "robert@fabrikam.com". In this example, "sandy" and "robert" are local names and "contoso.com" and "fabrikam.com" are domain names. The domain names are names of domains.

As described in detail below, the communication system 108 receives messages from the communication device 104A. These messages comprise requests to perform various actions. For example, the messages can comprise requests to log-in to the communication system 108. In another example, one or more of the messages can comprise request to initiate communication sessions between the communication device 104A and the communication device 104B. In yet another example, the messages can comprise requests to join conferences. In some instances, private data is needed to properly to direct the messages or process the requests. The messages include domain names. The communication system 108 directs the messages to appropriate computing devices based on the domain names in the messages.

Figure 2:
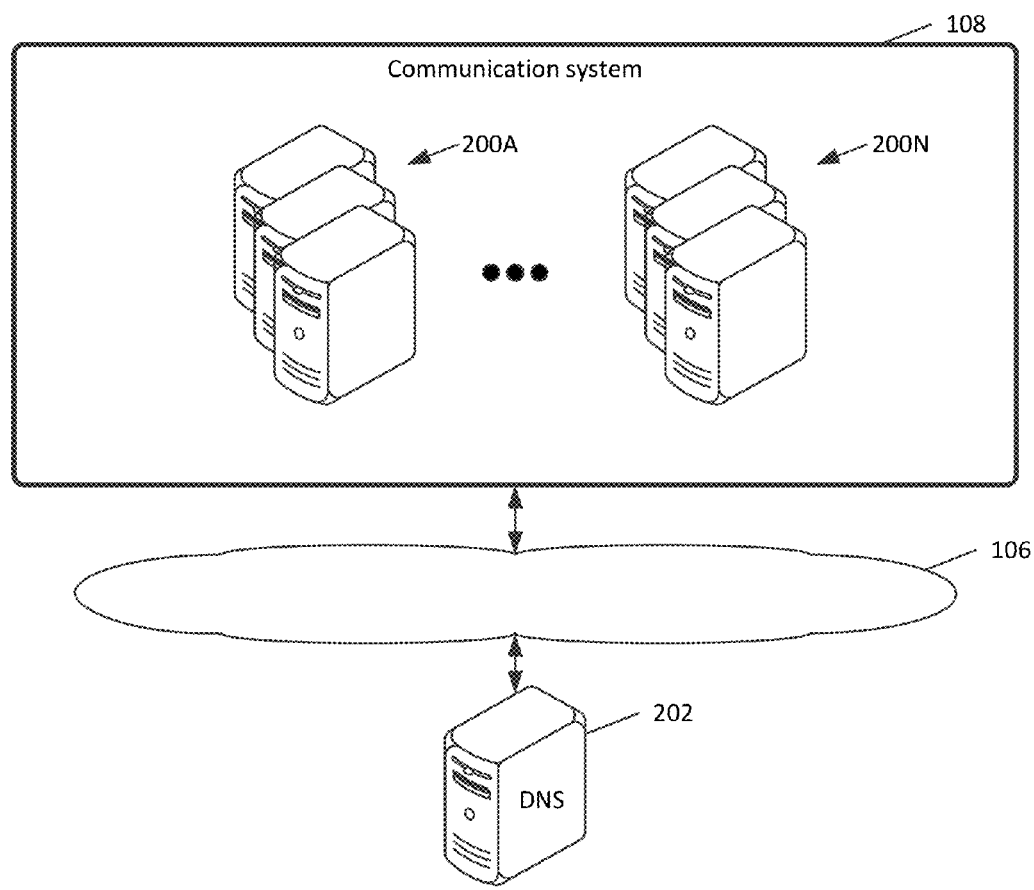
FIG. 2 is a block diagram that illustrates details of some example embodiments.

FIG. 2 is a block diagram that illustrates details of some example embodiments. As illustrated in the example of FIG. 2, the communication system 108 comprises a plurality of server pools 200A through 200N (collectively, "server pools 200"). Each of the server pools 200 comprises a set of computing devices. For ease of understanding, the example of FIG. 2 illustrates the computing devices in the server pools 200 as standalone server devices. In other embodiments, the server pools 200 can include one or more different types of computing devices, such as blade servers, rack-mount servers, and so on.

In some embodiments, the server pools 200 are distributed geographically. For example, the server pool 200A can be located in Nigeria, the server pool 200N can be located in Italy, and so on. In some embodiments, two or more of the server pools 200 are located in a single data center but act as separate units. In some embodiments, the computing devices within one or more of the server pools 200 are distributed geographically.

One or more of the computing devices in each of the server pools 200 are able to communicate with other computing devices over the network 106. In some embodiments, computing devices within the server pools 200 are able to communicate with each other through a network separate from the network 106. Furthermore, in some embodiments, the computing devices in different ones of the server pools 200 communicate with each other through one or more networks separate from the network 106.

In addition, a Domain Name System (DNS) server 202 is able to communicate with other computing devices over the network 106. As described in detail elsewhere in this document, the DNS server 202 receives DNS requests from the network 106 and responds to the DNS requests by providing corresponding DNS responses. The DNS requests specify hostnames. The corresponding DNS responses specify Internet Protocol (IP) addresses that correspond to the specified hostnames.

In some embodiments, the DNS server 202 is part of the communication system 108. In other embodiments, the DNS server 202 is operated separately from the communication system 108. Furthermore, some embodiments include multiple DNS servers. In some such embodiments, the DNS servers are geographically distributed.

Figure 3:
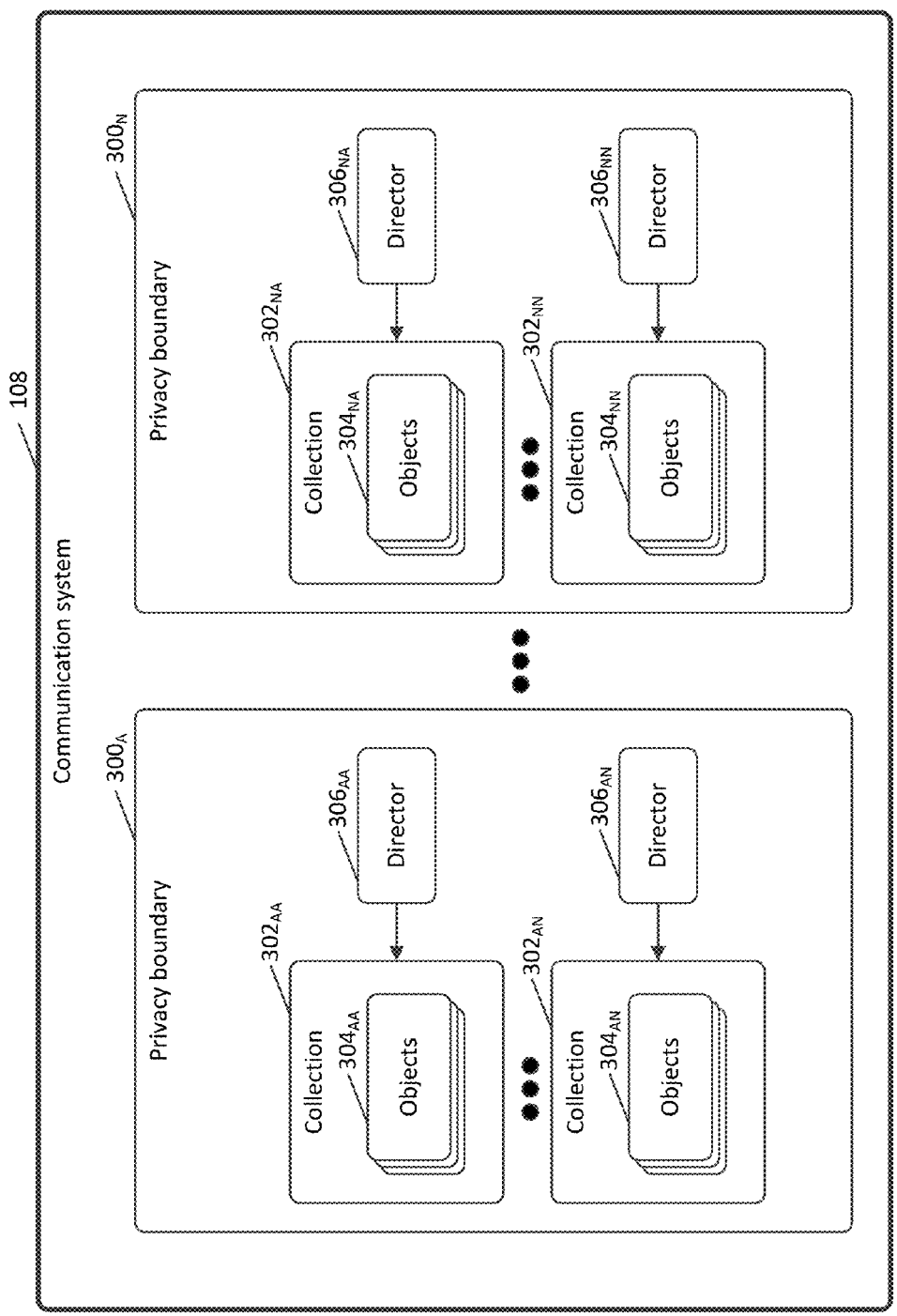
FIG. 3 is a block diagram that illustrates additional example details of a communication system.

FIG. 3 is a block diagram that illustrates example details of the communication system 108. In the example of FIG. 3, the communication system 108 comprises one or more privacy boundaries $300_A$ through $300_N$ (collectively, "privacy boundaries 300").

Each of the privacy boundaries 300 includes one or more collections 302. Otherwise stated, the collections 302 are grouped into the privacy boundaries 300. In the example of FIG. 3, the collections 302 in the privacy boundary $300_A$ are labeled $302_{AA}$ through $302_{AN}$ (collectively, "collections $302_A$"), collections in the privacy boundary $300_N$ are labeled $302_{NA}$ through $302_{NN}$ (collectively, "collections $302_N$").

Sets of users are associated with the collections 302 in the privacy boundaries 300. For example, a first set of users can be associated with the collections $302_A$ within the privacy boundary $300_A$, a second set of users can be associated with the collections $302_N$ within the privacy boundary $300_N$, and so on. Private data regarding the users associated with a privacy boundary are not accessible to computing devices unassociated with that privacy boundary.

Each of the collections 302 includes a plurality of objects 304. Otherwise stated, the objects 304 are divided among the collections 302. In the example of FIG. 3, each plurality of objects 304 has a reference number that includes an alphabetical suffix that matching that of the collection that includes the plurality of objects.

Furthermore, each of the collections 302 is associated with a director 306. In the example of FIG. 3, each of the directors 306 has a reference number that includes an alphabetical suffix that matches that of the associated collection.

In some embodiments, each of the privacy boundaries 300 corresponds to a different geographic area within which private data can be stored. For example, one of the privacy boundaries 300 can correspond to a group of countries that enforce particular privacy regulations regarding the storage of private data. In another example, the privacy boundaries 300 can correspond to geographic regions. In this example, one of the privacy boundaries 300 can correspond to North America, one of the privacy boundaries 300 can correspond to Europe, another one of the privacy boundaries 300 can correspond to China, and so on.

In various embodiments, the privacy boundaries 300 are established for various reasons. For example, in some embodiments, the privacy boundaries 300 are chosen by an organization based on an organizational structure of the organization. In other embodiments, the privacy boundaries 300 are mandated by one or more governmental organizations. For instance, privacy regulations applicable in a given region may prevent private data from being disclosed outside the given region.

As mentioned above, each of the privacy boundaries 300 includes one or more collections 302. Each of the collections 302 corresponds to a boundary within which the set of objects 304 associated with the collection is accessible. In other words, the objects 304 associated with a given one of the collections 302 are accessible to computing devices associated with the given collection, but not to computing devices unassociated with the given collection. In some embodiments, each of the collections 302 comprises an ACTIVE DIRECTORY® forest.

In various embodiments, computing devices can be associated with a collection in various ways. For example, in some embodiments, a computing device can be associated with a collection when a user of the computing device is associated with the collection. In another example, in some embodiments, a computing device can be associated with a collection when the computing device is in a server pool associated with the collection.

In some embodiments, each of the collections 302 within a given one of the privacy boundaries 300 has a separate copy of the same set of objects. However, the collections 302 in different ones of the privacy boundaries 300 do not have copies of the same set of objects. For example, the objects $304_{AA}$ can be copies of the objects $304_{AN}$, but the objects $304_{AA}$ are not copies of the objects $304_{NA}$. Thus, computing devices associated with each of the collections 302 within a given security boundary can have access to the same objects, but computing devices associated with collections outside the given security boundary do not have access to these objects.

Each of the collections 302 is associated with one or more of the server pools 200. In some embodiments, none of the server pools 200 are associated with more than one of the collections 302. The server pools 200 associated with a given one of the collections 302 process data for different sets of people or resources represented by objects in the given collection. A server pool 200 that processes data for a given person can be referred to herein as the given person's home pool. A server pool 200 that processes data for a given resource can be referred to herein as the given resource's home pool.

As mentioned briefly above, the collections 302 are associated with the directors 306. The directors 306 comprise services that receive messages and direct the messages to the server pools 200 or to other ones of the directors 306. The messages comprise requests to perform given actions. Detailed discussion of the directors 306 is found elsewhere in this document. In some embodiments, one or more of the directors 306 are provided by one or more of the server pools 200 of the collections 302 associated with the directors 306. In other embodiments, other computing devices provide one or more of the directors 306.

Figure 4:
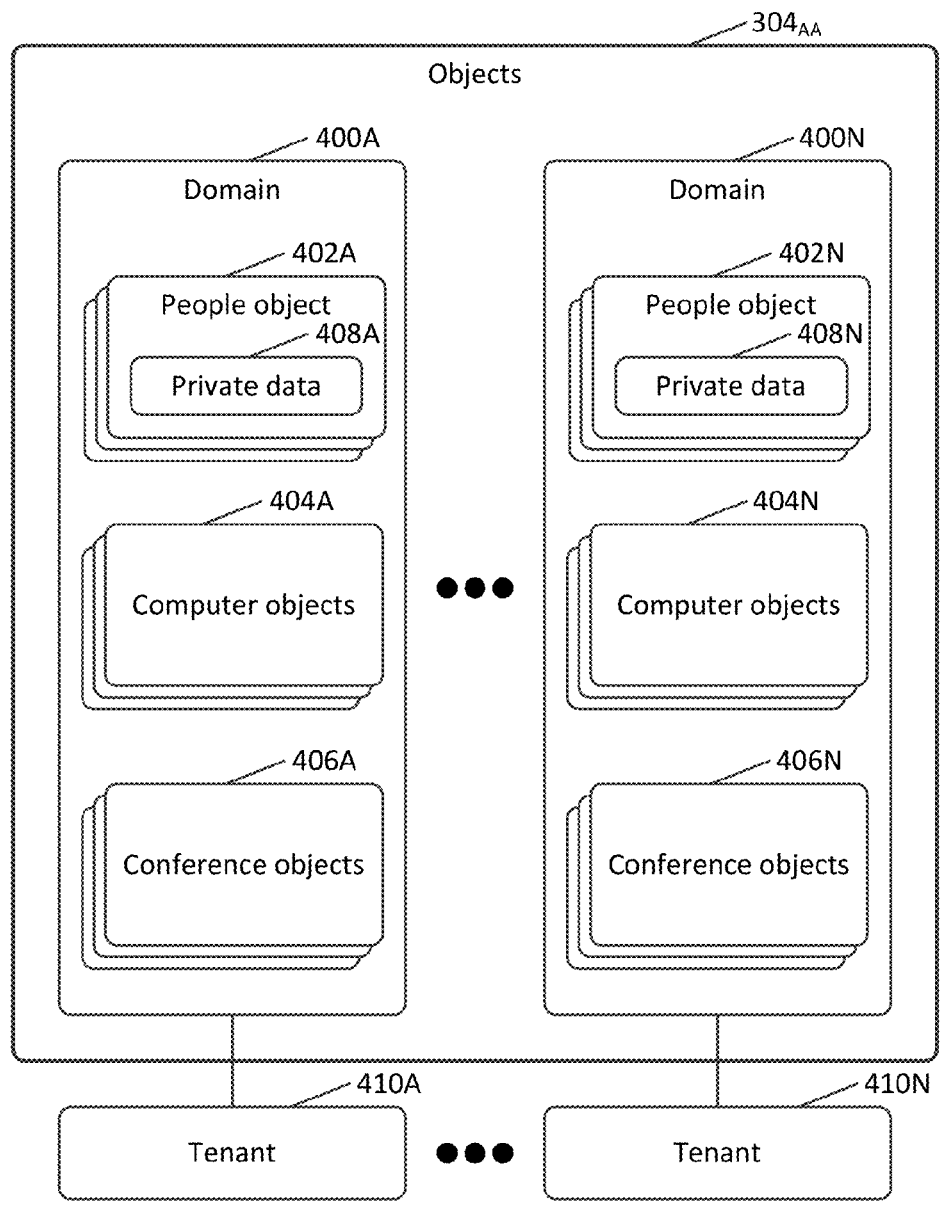
FIG. 4 is a block diagram that illustrates example objects within a collection.

FIG. 4 is a block diagram that illustrates example types of objects within a given one of the collections 302. The example of FIG. 4 refers to the objects $304_{AA}$. Readers will understand that other sets of objects 304 can include similar types of objects.

The objects $304_{AA}$ within the collection $302_A$ are divided into two or more domains 400A through 400N (collectively, "domains 400N"). Each of the domains 400 has a different domain name that names the domain. For example, the domain 400A can have the domain name "contoso.com" and the domain 400N can have the domain name "fabrikam.com."

In the example of FIG. 4, each of the domains 400 includes people objects 402, computer objects 404, and conference objects 406. The people objects 402 comprise one or more data structures that store data regarding people. The computer objects 404 comprise one or more data structures that store data regarding computers. The conference objects 408 comprise one or more data structures that store data regarding conferences. In other embodiments, the domains 400 include other types of objects. For example, the domains 400 can include group objects that comprise data structures that store data regarding groups of people. In other example embodiments, the domains 400 do not include the computer objects 404, and/or the conference objects 406.

The people objects 402 correspond to individual people. For example, one of the people objects 402 can correspond to the user 102A and another one of the people objects 402 can correspond to the user 102B. The people objects 402 comprise one or more data structures that store data regarding the corresponding people.

The data stored by the people objects 402 include private data 408 regarding the corresponding people. The communication system 108 does not make the private data 408 within the people objects 402 accessible to computing devices outside the privacy boundary $300_A$ (i.e., the privacy boundary that contains the people objects 402). For example, the private data 408 in a people object associated with a collection within the privacy boundary $300_A$ is not accessible to a computing device associated with a collection within the privacy boundary $300_B$.

The private data 408 in the people objects 402 can include various types of information about the corresponding person. For example, the people objects 402 can include contact lists, telephone numbers, demographic information, contact information, address information, passwords, digital certificates, encryption keys, and/or other types of information regarding the corresponding people. In some embodiments, the private data 408 includes data that specifies the home pools of the users. Furthermore, the private data 408 can include IP addresses of computing devices of the users. In some embodiments, one or more governmental agencies or corporate entities define what data within the people objects 402 is considered to be the private data 408.

In the example of FIG. 4, the domains 400 are associated with tenants 410A through 410N (collectively, "tenants 410.") The tenants 410 are entities, such as enterprises, non-governmental organizations, governmental organizations, and so on. In some embodiments, the communication system 108 is operated by a service provider. The tenants 410 enter agreements with the service provider. These agreements obligate the service provider to provide the services of the communication system 108 to the tenants 410. In some instances, the service provider provides the services of the communication system 108 to the tenants 410 in such a way that the tenants 410 do not need to interact with each other or know of the existence of each other.

When the tenants 410 enter the agreements with the service provider, domains (such as the domains 400) are associated with the tenants 410. Each of the tenants 410 is associated with at least one domain. In some embodiments, a single one of the tenants 410 can be associated with multiple domains.

Figure 5:
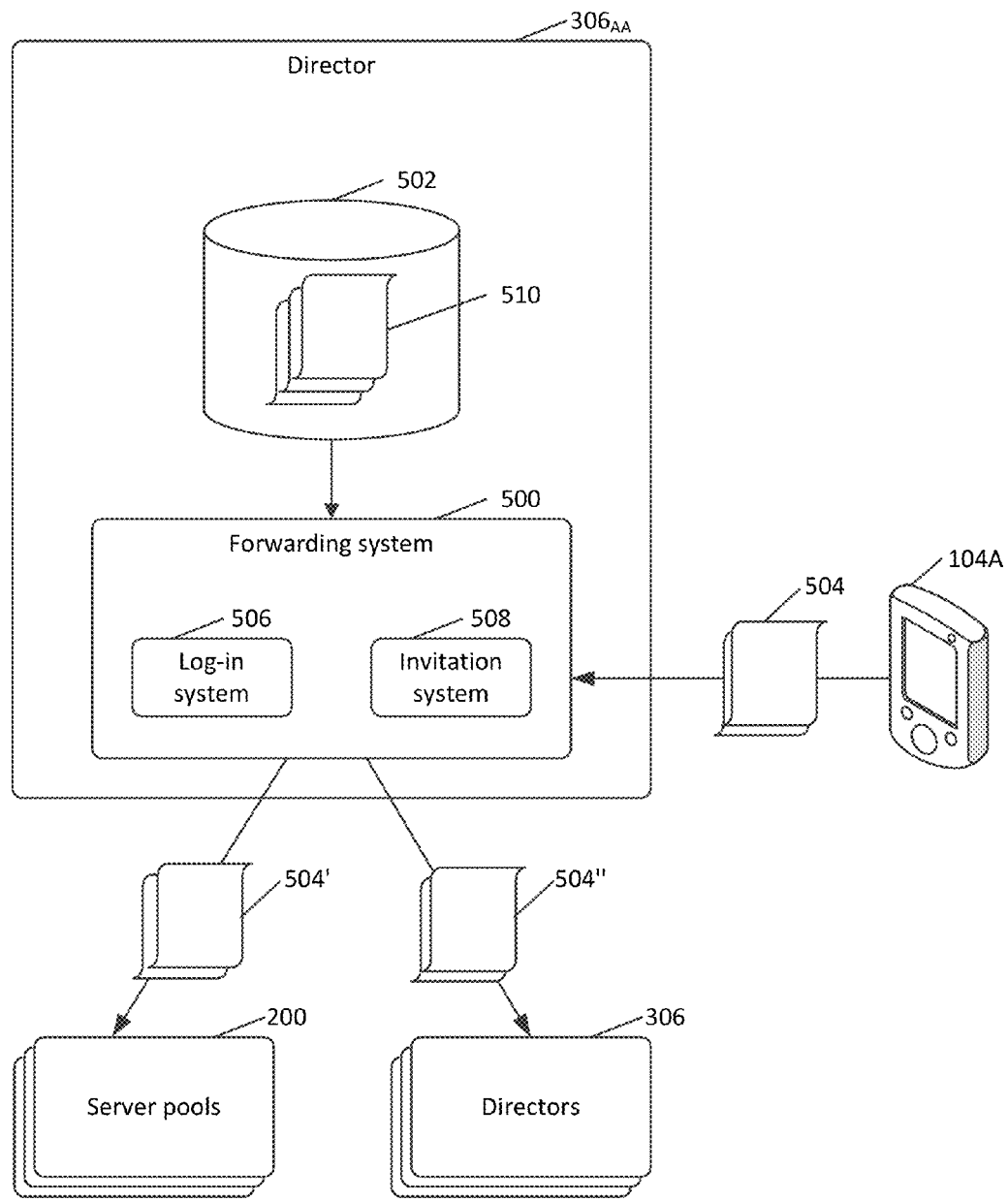
FIG. 5 is a block diagram that illustrates example details of a director.

FIG. 5 is a block diagram that illustrates example details of the director $306_{AA}$. Although the example of FIG. 5 and the associated description describe the director $306_{AA}$, the reader will appreciate that FIG. 5 and the associated description may be applicable to other ones of the directors 306.

In the example of FIG. 5, the director $306_{AA}$ provides a forwarding system 500 and has access to a mapping 502. The forwarding system 500 receives messages 504 from the communication device 104A. The forwarding system 500 selectively directs the messages 504 to the server pools 200 associated with the collection $302_{AA}$ or other ones of the director 306. The messages 504 comprise requests to perform given actions. For example, one of the messages 504 can comprise a request to log-in to the communication system 108. In another example, one of the messages 504 can comprise a request to invite the user 102B to join a communication session. In yet another example, one of the messages 504 can comprise a request to join a conference. Consequently, the forwarding system 500 forwards the message to a director of a collection that includes the private data. Because the director of this collection includes the private data, the director is able to properly direct the message to the server pool associated with the given user.

The messages 504 specify domain names. After receiving the messages 504, the forwarding system 500 determines which ones of the collections 302 are associated with the domain names specified by the messages 504.

In some instances, the forwarding system 500 needs access to the private data 408 to properly direct the messages 504. For example, a given message may need to be directed to one of the server pools 200 that is associated with a given user. In this example, the private data 408 for the given user specifies which one of the server pools 200 is associated with the given user. In this example, the forwarding system 500 is unable to access this private data if the given user is not associated with one of the collections $302_A$. For instance, the forwarding system 500 may be unable to access this private data if the given user is associated with one of the collections $302_N$.

The messages 504 include messages 504'. The messages 504' specify domain names associated with the collections $302_A$ (i.e., the collections within the privacy boundary $300_A$). The forwarding system 500 forwards the messages 504' to the server pools 200 associated with the collections $302_A$. For example, the domain name "contoso.com" can be associated with the collection $302_{AA}$. In this example, if one of the messages 504 specifies the domain name "contoso.com," the forwarding system 500 forwards the message to one of the server pools 200 associated with the collection $302_{AA}$.

The messages 504 also include messages 504". The messages 504" specify domain names associated with ones of the collections 302 that are outside the privacy boundary $300_A$. The forwarding system 500 forwards messages 504" to the directors 306 of the collections 302 associated with the domain names specified by the messages 504". For example, the domain name "fabrikam.com" can be associated with the collection $302_{NA}$. In this example, if one of the messages 504 specifies the name "fabrikam.com," the forwarding system 500 forwards the message to the director $306_{NA}$.

In the example of FIG. 5, the forwarding system 500 comprises a log-in system 506 and an invitation system 508. As described elsewhere in this document in greater detail, the log-in system 506 directs ones of the messages 504 that comprise log-in requests. The invitation system 508 directs ones of the messages 504 that comprise invitation requests.

Readers will understand that some embodiments of the forwarding system 500 include additional systems for additional message types.

In the example of FIG. 5, the forwarding system 500 uses the mapping 502 to determine which ones of the collections 302 are associated with the domain names specified by the messages 504. In the example of FIG. 5, the mapping 502 comprises a plurality of entries 510. Each of the entries 510 comprises a mapping from a domain name to one of the collections 302. In this example, the forwarding system 500 identifies a collection associated with a domain name by identifying one of the entries 510 that maps the domain name to the collection. For example, one of the entries 510 can comprise a mapping from the domain name "contoso.com" to the collection $302_{AA}$.

In some embodiments, each of the directors 306 has access to a separate copy of the mapping 502. For example, the director $306_{AA}$ has access to one copy of the mapping 502, the director $306_{AN}$ has access to another copy of the mapping 502, the director $306_{NA}$ has access to yet another copy of the mapping 502, and so on. In this way, for each domain name associated with one of the collections 302, each of the directors 306 is able to identify the collection associated with the domain name.

Various embodiments implement the mapping 502 in various ways. For example, some embodiments implement the mapping 502 as a relational database. In another example, some embodiments implement the mapping 502 as one or more XML documents. In yet another example, some embodiments implement the mapping 502 using a directory system, such as ACTIVE DIRECTORY®.

In some embodiments, the director $306_{AA}$ or another computing device adds a new entry to the mapping 502 after a new one of the tenants 410 subscribes to the communication system 108. The new entry maps a domain name associated with the new tenant to one of the collections 302 that stores private data regarding people and/or resources associated with the new tenant. For example, if the collection $302_{NA}$ contains objects that store data regarding people associated with the new tenant and the new tenant is associated with the domain name "contoso.com," the director $306_{AA}$ or another computing device adds a new entry to the mapping 502 that maps "contoso.com" to the collection $302_{NA}$.

Figure 6:
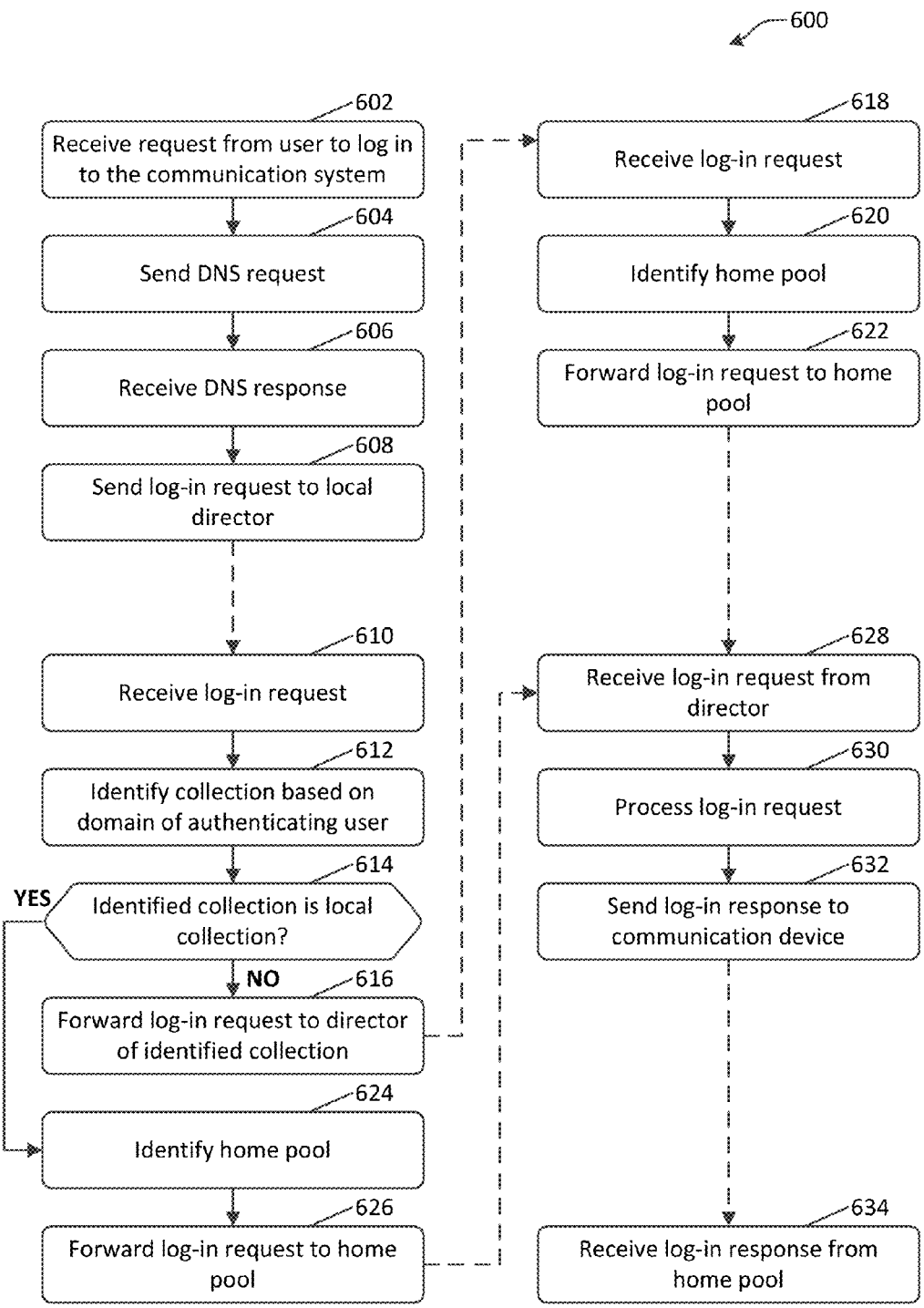
FIG. 6 is a flowchart illustrating an example log-in operation.

FIG. 6 is a flowchart illustrating an example log-in operation 600. After the operation 600 starts, the communication device 104A receives a request from the user 102A to log in to the communication system 108 (602). In various embodiments, the communication device 104A can receive the request in various ways. For example, the communication device 104A can present a graphical user interface. In this example, the user 102A can use one or more features, such as text areas, buttons, checkboxes, etc., to provide the request to the communication device 104A. In another example, the communication device 104A receives the request when the communication device 104A receives a command in a command line interface or in a web services interface.

In response to receiving the request to log-in to the communication system 108, the communication device 104A sends a DNS request to the DNS server 202 (604). The DNS request specifies a hostname associated with a log-in resource of the communication system 108. For example, if the hostname associated with the log-in resource of the communication system 108 is "www.example.com," the DNS request specifies the hostname "www.example.com." In other embodiments, the communication device 104A sends the DNS request to the DNS server 202 automatically without receiving direct input to do so from the user 102A.

After sending the DNS request, the communication device 104A receives a DNS response from the DNS server 202 (606). The DNS response specifies an Internet Protocol (IP) address associated with the hostname specified by the DNS request. The IP address specified by the DNS response is the IP address of one of the directors 306. For ease of explanation, this document refers to the director 306 whose IP address is specified by the DNS response as the "local director." This document also assumes that the local director has the details illustrated in the example of FIG. 5.

In some embodiments, the DNS server 202 provides DNS responses containing different IP addresses in response to DNS requests specifying the same hostname. In such embodiments, the DNS server 202 can select the IP addresses to include in the DNS responses based on the IP addresses of the computing devices that send the DNS requests. In some instances, the IP addresses of the computing devices are correlated with the physical locations of the computing devices. For example, computing devices in China may have a particular range of IP addresses and computing devices in Canada can have a different range of IP addresses. Based on the knowledge that certain IP addresses are correlated with certain geographic regions, the DNS server 202 can select the IP addresses of the directors 306 associated with geographic regions of the computing devices sending the DNS requests. Thus, the "local director" can be the director 306 that is geographically closer to the communication device 104A than any other ones of the directors 306 in the communication system 108.

Once the communication device 104A receives the DNS response, the communication device 104A sends a log-in request to the local director (608). In some embodiments, the communication device 104A sends the log-in request to the local director without receiving additional input from the user 102A. The log-in request includes a domain name. Various embodiments include various additional data in the log-in request. For example, some embodiments include a local name of the user 102A in the log-in request. In another example, some embodiments include an encrypted password or other security credential in the log-in request.

Subsequently, the log-in system 506 of the local director receives the log-in request from the communication device 104A (610). When the log-in system 506 of the local director receives the log-in request, the log-in system 506 uses the mapping 502 to identify one of the collections 302 based on the domain name of the user 102A (612). For ease of explanation, this document can refer to the identified collection as the "home collection."

After identifying the home collection, the log-in system 506 determines whether the home collection and the local collection are both within the same one of the privacy boundaries 300 (614). The local collection is the collection 302 associated with the local director. For example, if the local director is the director $306_{AA}$, the local collection is the collection $302_{AA}$. The collection $302_{AA}$ is within the privacy boundary $300_A$. In this example, the director $306_{AA}$ determines whether the home collection is any of the collections $302_A$. In some instances, the home collection is the local collection.

If the home collection and the local collection are not both within the same one of the privacy boundaries 300, the local director does not have access to the private data 408 of the user 102A. Accordingly, the local director does not have access to data indicating the home pool of the user 102A. Hence, if the home collection and the local collection are not both within the same one of the privacy boundaries 300 ("NO" of 614), the log-in system 506 forwards the log-in request to the director 306 of the home collection (616). For example, if the home collection is the collection $302_{NN}$ and the local collection is the collection $302_{AA}$, the log-in system 506 forwards the log-in request to the director $306_{NN}$ because the collections $302_{AA}$ and $302_{NN}$ are not within the same privacy boundary.

Subsequently, the director 306 of the home collection receives the log-in request (618). For ease of explanation, this document can refer to the director 306 of the home collection as the home director. For example, if the collection $302_{NA}$ is associated with the domain name of the user 102A, the collection $302_{NA}$ is the home collection. In this example, the director $306_{NA}$ is the home director.

After the home director receives the log-in request, the home director identifies a home pool of the user 102A (620). The home pool of the user 102A is among the server pools 200 associated with the home collection. The home pool of the user 102A is responsible for handling various computing tasks for the user 102A.

In various embodiments, the home director identifies the home pool of the user 102A in various ways. For example, the home director can access the people object 402 of the user 102A. In this example, the people object 402 of the user 102A specifies which of the server pools 200 is the home pool of the user 102. In another example, the home director stores data that maps users of the collections within the home collection's privacy boundary to the user's home pools.

After identifying the home pool of the user 102A, the home director forwards the log-in request to the home pool of the user 102A (622). For example, if the server pool 200A is the home pool of the user 102A, the home director forwards the log-in request to the server pool 200A.

On the other hand, if the home collection and the local collection are within the same one of the privacy boundaries 300, the local director has access to the private data 408 of the user 102A. Accordingly, the local director is able access data indicating the home pool of the user 102A. Hence, if the home collection and the local collection are within the same one of the privacy boundaries 300 ("YES" of 614), the log-in system 506 identifies the home pool of the user 102A (624). For example, if the home collection is the collection $302_{AN}$ and the local collection is the collection $302_{AA}$, the log-in system 506 identifies the home pool of the user 102A because the collections $302_{AA}$ and $302_{AN}$ are within the same privacy boundary $300_A$. In various embodiments, the log-in system 506 identifies the home pool of the user 102A in various ways. For example, the log-in system 506 can identify the home pool of the user 102A in the ways described above as being performed by the home director to identify the home pool of the user 102A. After identifying the home pool of the user 102A, the log-in system 506 forwards the log-in request to the home pool of the user 102A (626).

Subsequently, the home pool of the user 102A receives the log-in request from the home director (628). After the home pool receives the log-in request, the home pool processes the log-in request (630). In various embodiments, the home pool processes the log-in request in various ways. For example, the home pool can verify a security credential in the log-in request. In other embodiments, the home pool processes the log-in request by forwarding the log-in request to another computing device. In such embodiments, the communication system 108 may be federated with another communication system. In such embodiments, the home pool can process the log-in request by forwarding the log-in request to a gateway service for the federated communication system. Upon receiving the log-in request, the federated communication system processes the log-in request. In such embodiments, it may be unnecessary for the home pool to send a log-in response to the communication device 104A.

Furthermore, the home pool can generate data that associates the IP address of the communication device 104A with the user 102A. In this way, the home pool generates data that records the fact that the user 102A is currently associated with a particular IP address.

Once the home pool processes the log-in request, the home pool sends a log-in response to the communication device 104A (632). The log-in response can contain various data. For example, if a security credential in the log-in request is valid, the log-in response can include data indicating that the user 102A has successfully logged-in to the communication system 108.

Subsequently, the communication device 104A receives the log-in response from the home pool (634). In various embodiments, the communication device 104A can perform various actions upon receiving the log-in response. For example, the communication device 104A can display an on-screen message indicating that the user 102A successfully logged-in to the communication system 108.

Figure 7:
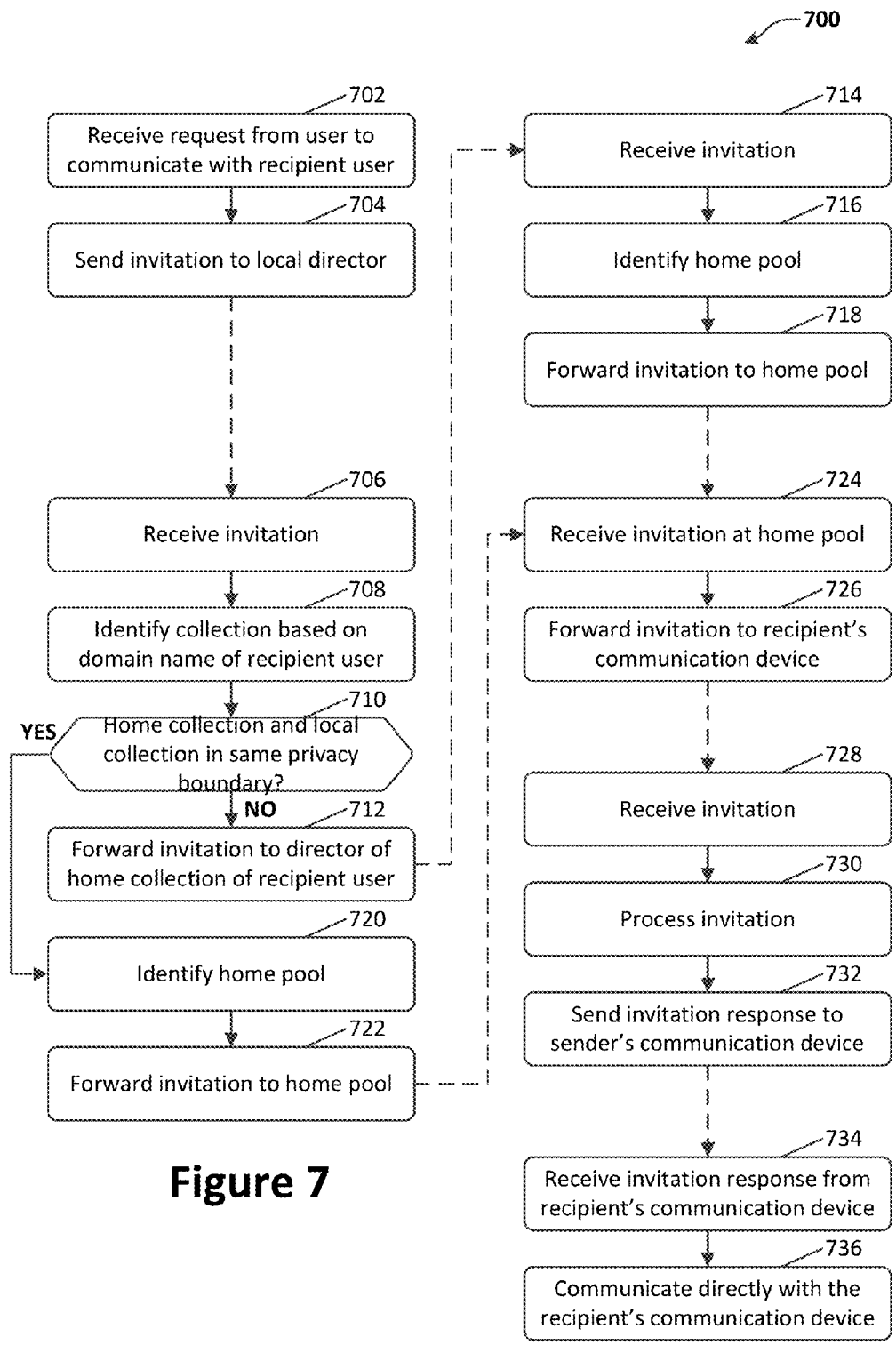
FIG. 7 is a flowchart illustrating an example invitation operation.

FIG. 7 is a flowchart illustrating an example invitation operation 700. As illustrated in the example of FIG. 7, the communication device 104A receives a request from the user 102A to communicate with a recipient user (702). For ease of explanation, this document assumes that the recipient user is the user 102B.

In various embodiments, the communication device 104A receives the request from the user 102A to communicate with the user 102B in various ways. For example, the communication device 104A can display a contact list to the user 102A. In this example, the contact list lists the user 102B. In this example, the communication device 104A can receive the request to communicate with the user 102B when the communication device 104A receives a selection by the user 102A of the user 102B from the contact list. In another example, the communication device 104A receives the request from the user 102A to communicate with the user 102B when the user 102A dials a telephone number of the user 102B into a keypad.

In response, the communication device 104A sends an invitation to the local director (704). For example, if the local director is the director 306$_{AA}$, the communication device 104A sends the invitation to the director 306$_{AA}$. The invitation comprises a request to invite the user 102B to join a communication session between the user 102A and the user 102B. The invitation specifies a username of the user 102B. The username of the user 102B comprises a domain name.

In various embodiments, the invitation conforms to various communication protocols. For example, the invitation can conform to the Session Initiation Protocol (SIP). In another example, the invitation can conform to the Hypertext Transfer Protocol (HTTP).

After the communication device 104A sends the invitation to the local director, the invitation system 508 of the local director receives the invitation (706). After receiving the invitation, the invitation system 508 of the local director identifies a collection based on the domain name of the user 102B (708). For ease of explanation, this document can refer to the identified collection as the "home collection."

Once the invitation system 508 of the local director identifies the home collection, the invitation system 508 of the local director determines whether the home collection and the local collection are within the same one of the privacy boundaries 300 (710). As mentioned above, the local collection is the collection 302 associated with the local director.

If the home collection and the local collection are not within the same one of the privacy boundaries 300, the local director does not have access to the private data 408 of the user 102B. Accordingly, the local director does not have access to data indicating the home pool of the user 102B. Hence, if the home collection and the local collection are not within the same one of the privacy boundaries 300 ("NO" of 710), the invitation system 508 of the local director forwards the invitation to the director of the home collection (712). In other words, the invitation system 508 of the local director forwards the invitation to the home director.

Subsequently, the invitation system 508 of the home director receives the invitation (714). After receiving the invitation, the home director identifies the home pool of the user 102B (716). The home director can identify the home pool of the user 102B in a manner similar to that described above with regard to the operation 600. After identifying the home pool of the user 102B, the invitation system 508 of the home director forwards the invitation to the home pool of the user 102B (718).

If the home collection is within the same one of the privacy boundaries 300 as the local collection, the local director has access to the private data 408 of the user 102B. Accordingly, the local director has access to data that indicates the home pool of the user 102B. Hence, if the home collection is within the same one of the privacy boundaries 300 as the local collection ("YES" of 710), the invitation system 508 of the local director identifies the home pool of the user 102B (720). The invitation system 508 of the local director forwards the invitation to the home pool of the user 102B (722).

Subsequently, the home pool of the user 102B receives the invitation (724). After receiving the invitation, the home pool of the user 102B forwards the invitation to the communication device 104B (726). The home pool of the user 102B is able to forward the invitation to the communication device 104B because the user 102B has previously logged-in to the communication system 108. The home pool of a given user learns the IP address of the communication device used by the given user when the given user logs-in to the communication system 108.

In other embodiments, the communication system 108 is federated with another communication system. In such embodiments, the home pool forwards the invitation to a gateway service for the federated communication system. Upon receiving the log-in request, the federated communication system forwards the invitation to the communication device 104A.

Subsequently, the communication device 104B receives the invitation (728). When the communication device 104B receives the invitation, the communication device 104B processes the invitation (730). In various embodiments, the communication device 104B processes the invitation in various ways. For example, the communication device 104B can process the invitation by notifying the user 102B that the user 102A wants to communicate with the user 102B.

The communication device 104B then sends an invitation response to the communication device 104A (732). In various embodiments, the invitation can contain various data. For example, the invitation can contain data indicating whether or not the user 102B accepted the invitation to communicate with the user 102A. In another example, the invitation can contain data requesting communication parameters.

In some embodiments, the invitation specifies the IP address of the communication device 104A. Consequently, the communication device 104B can format the invitation response to specify the IP address of the communication device 104A. Thus, the communication device 104B can send the invitation response directly across the network 106 to the communication device 104A without involvement of the communication system 108.

Subsequently, the communication device 104A receives the invitation response from the communication device 104B (734). The invitation response specifies the IP address of the communication device 104B. Consequently, the communication device 104A learns the IP address of the communication device 104B from the invitation response. Hence, the communication device 104A can use the IP address of the communication device 104B to communicate directly across the network 106 with the communication device 104B without involvement of the communication system 108 (736).

Figure 8:
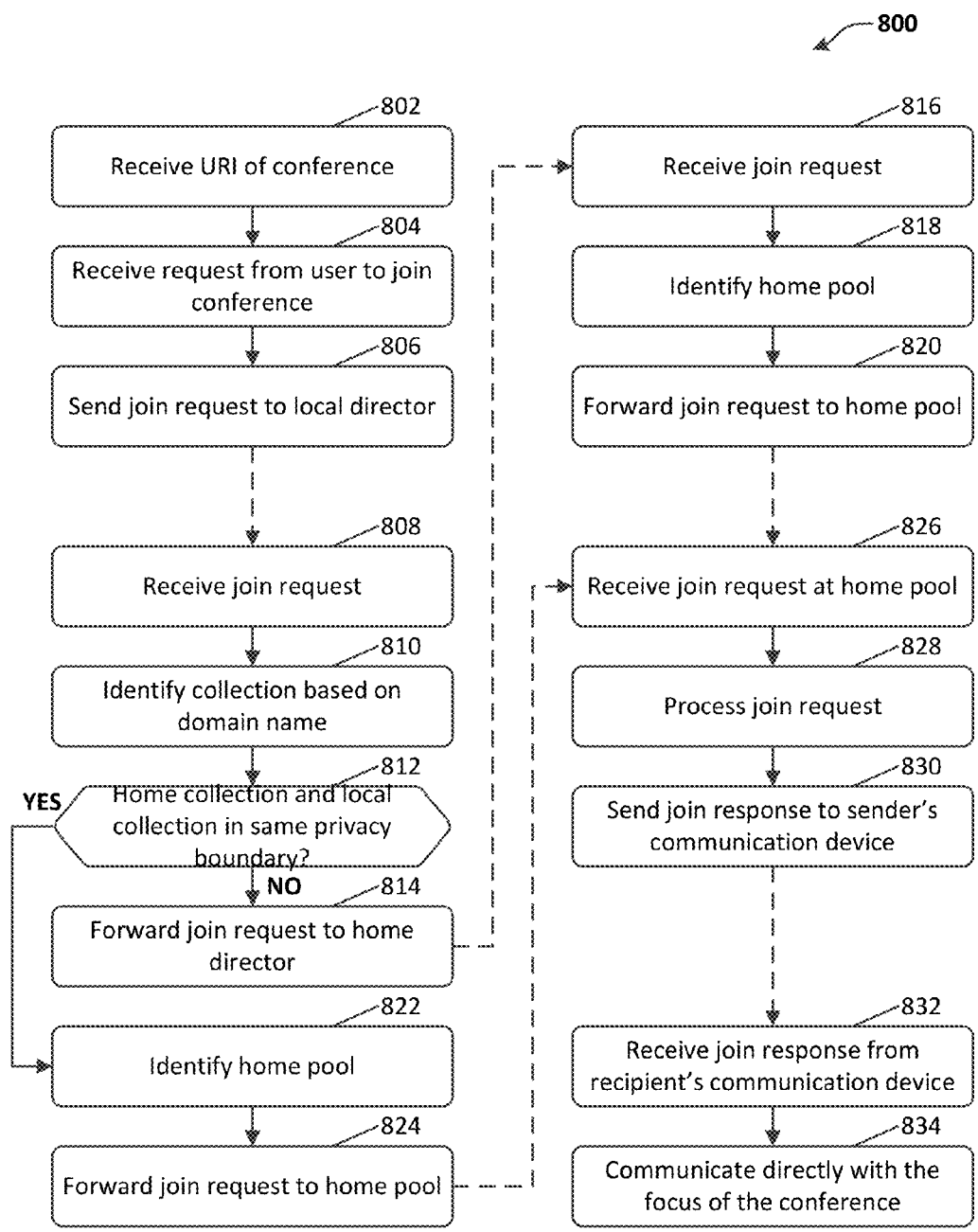
FIG. 8 is a flowchart illustrating an example operation to join a conference.

FIG. 8 is a flowchart illustrating an example operation 800 to join a conference. Multiple users are able to communicate in a conference. For example, several people can hear what each other is saying in a telephone conference. Participants in a video conference may be able to see the other participants and hear what the other participants are saying. In some embodiments, each conference is associated with a focus. The focus of the conference is a service provided by a computing device. The focus distributes information about the conference to communication devices of users who have joined the conference. For example, the focus can distribute information about how to connect to voice, video, or data streams of the conference.

One of the server pools 200 provides a focus for a particular conference. When the conference is scheduled, the communication device 104A receives a Uniform Resource Identifier (URI) for the conference (802). In various embodiments, the communication device 104A receives the URI for the conference in various ways. For example, the communication device 104A can receive an email message or SMS text message containing URI for the conference.

The URI for the conference identifies the conference. The URI for the conference includes a domain name. For example, "contoso.com/conf.asp?id=324342" can be the URI for the conference. In this example, "contoso.com" is the domain name.

At some time after the communication device 104A receives URI of the conference, the communication device 104A receives a request from the user 102A to join the conference (804). In various embodiments, the communication device 104A can receive the request to join the conference in various ways. For example, the communication device 104A can receive the request to join the conference when the user 102A clicks on a link containing the URI of the conference.

After the communication device 104A receives the request from the user 102A to join the conference, the communication device 104A sends a join request to the local director (806). The join request specifies at least the domain name in the URI of the conference. For example, the join request can specify the full URI of the conference.

In various embodiments, the join request conforms to various communication protocols. For example, the join request can conform to the Hypertext Transfer Protocol or another communication protocol.

Subsequently, the local director receives the join request (808). The local director then identifies a collection based on the domain name indicated by the URI of the conference (810). For ease of explanation, this document refers to the identified collection as the "home collection." In some embodiments, the home collection contains a conference object 406 that stores data regarding the conference. The local director uses the mapping 502 to identify the home collection. After identifying the home collection, the local director determines whether the home collection and the local collection are within the same one of the privacy boundaries 300 (812).

If the home collection and the local collection are not within the same one of the privacy boundaries, the local director does not have access to information indicating the home pool of the conference. For instance, the local director does not have access to the conference object 406 that stores data regarding the conference. The home pool of the conference includes a computing device that provides the focus for the conference. Hence, if the home collection and the local collection are not within the same one of the privacy boundaries ("NO" of 812), the local director forwards the join request to the home director (814). The home director of the conference is the director 306 of the home collection.

Subsequently, the home director receives the join request (816). The home director then identifies the home pool of the conference (818). In various embodiments, the home director identifies the home pool of the conference in various ways. For example, one of the conference objects 406 can store data that indicates the home pool of the conference. In this example, the home director can use this conference object to identify the home pool of the conference. After identifying the conference's home pool, the home director forwards the join request to the conference's home pool (820).

If the home collection and the local collection are within the same one of the privacy boundaries 300 ("YES" of 812), the local director identifies the conference's home pool (822). In some instances, the conference's home pool can be associated with a collection other than the local collection. After identifying the conference's home pool, the local director forwards the join request to the conference's home pool (824).

Subsequently, the conference's home pool receives the join request (826). When the conference's home pool receives the join request, the focus of the conference processes the join request (828). In various embodiments, the focus of the conference can process the join request in various ways. For example, the focus can determine whether the user 102A is authorized to join the conference.

Next, the focus sends a join response to the communication device 104A (830). The communication device 104A later receives the join response (832). After the communication device 104A receives the join response, the communication device 104A and the focus of the conference communicate directly over the network 106 without the involvement of the communication system 108 (834). In this way, the user 102A is able to join the conference.

Figure 9:
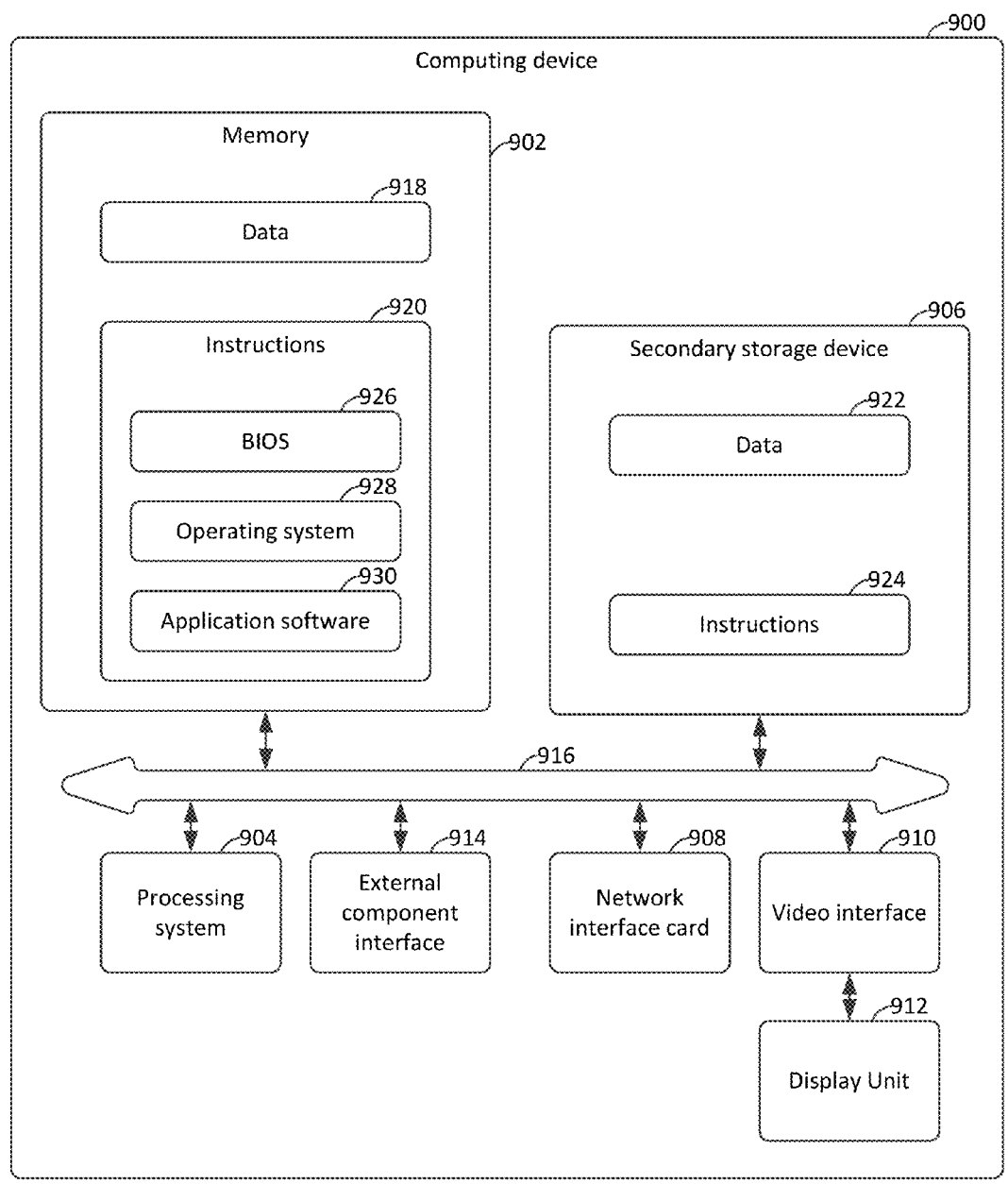
FIG. 9 is a block diagram illustrating an example computing device.

FIG. 9 is a block diagram illustrating example physical components of a computing device 900. The communication devices 104, computing devices in the communication system 108, the DNS server 202, computing devices in the network 106, and other computing devices in the system 100 can have components similar to those of the computing device 900. It should be appreciated that these computing devices can be implemented using computing devices having components other than those illustrated in the example of FIG. 9.

As used herein, the term computer readable media may include computer storage media and communication media. A computer storage medium is a device or article of manufacture that stores data and/or computer-executable instructions. A computer storage medium does not consist of transitory signals. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

Communication media may include any information delivery media that carries computer-executable instructions, data structures, program modules, or other data in a modulated data signal. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 9, the computing device 900 comprises a memory 902, a processing system 904, a secondary storage device 906, a network interface card 908, a video interface 910, the display unit 912, an external component interface 914, and a communication medium 916. The memory 902 includes one or more computer storage media capable of storing data 918 and/or computer-executable instructions 920.

The secondary storage device 906 includes one or more computer storage media. The secondary storage device 906 stores data 922 and computer-executable instructions 924 not directly accessible by the processing system 904. In other words, the processing system 904 performs an I/O operation to retrieve data and/or software instructions from the secondary storage device 906.

The processing system 904 includes one or more processing units. A processing unit is a physical device or article of manufacture comprising one or more integrated circuits that read data and instructions from computer readable media, such as the memory 902 and the secondary storage device 906, and selectively execute the instructions. In various embodiments, the processing system 904 is implemented in various ways. For example, the processing system 904 can be implemented as one or more processing cores. In another example, the processing system 904 can comprise one or more separate microprocessors. In yet another example embodiment, the processing system 904 can comprise an application-specific integrated circuit (ASIC) that provides specific functionality. In yet another example, the processing system 904 provides specific functionality by using an ASIC and by executing computer-executable instructions.

The network interface card 908 is a device or article of manufacture that enables the computing device 900 to send data to and receive data from a communication network. In different embodiments, the network interface card 908 is implemented in different ways. For example, the network interface card 908 can be implemented as an Ethernet interface, a token-ring network interface, a fiber optic network interface, a wireless network interface (e.g., Wi-Fi, WiMax, etc.), or another type of network interface.

The video interface 910 enables the computing device 900 to output video information to the display unit 912. The display unit 912 can be various types of devices for displaying video information, such as a cathode-ray tube display, an LCD display panel, a plasma screen display panel, a touch-sensitive display panel, an LED screen, or a projector. The video interface 910 can communicate with the display unit 912 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 914 enables the computing device 900 to communicate with external devices. For example, the external component interface 914 can be a USB interface, a FireWire interface, a serial port interface, a parallel port interface, a PS/2 interface, and/or another type of interface that enables the computing device 900 to communicate with external devices. In various embodiments, the external component interface 914 enables the computing device 900 to communicate with various external components, such as external storage devices, input devices, speakers, modems, media player docks, other computing devices, scanners, digital cameras, and fingerprint readers.

The communications medium 916 facilitates communication among the hardware components of the computing device 900. In the example of FIG. 9, the communications medium 916 facilitates communication among the memory 902, the processing system 904, the secondary storage device 906, the network interface card 908, the video interface 910, and the external component interface 914. The communications medium 916 can be implemented in various ways. For example, the communications medium 916 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the instructions 920 in the memory 902 can include Basic Input/Output System (BIOS) instructions 926 and operating system instructions 928. Execution of the BIOS instructions 926 by the processing system 904 causes the computing device 900 to boot up. Execution of the operating system instructions 928 causes the computing device 900 to provide an operating system that coordinates the activities and sharing of resources of the computing device 900. Furthermore, the memory 902 stores application software 930. Execution of the application software 930 by the processing system 904 configures the computing device 900 to provide one or more applications. The memory 902 also stores data 918 used by programs that execute on the computing device 900.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders or be executed concurrently. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The claimed invention is:

1. A method of routing messages, the method comprising:
   receiving, at a first director, a first message from a first communication device, the first message comprising a request to perform a given action, the first message specifying a domain name, wherein the first local director is associated with at least one local collection within a first privacy boundary of a communication system;

identifying, by the first director, a given collection as being associated with the domain name;

determining whether the given collection is within the first privacy boundary, wherein when the given collection is within the first privacy boundary, the given collection has access to private data needed to direct the first message, and wherein when the given collection is outside the first privacy boundary, the given collection does not have access to the private data;

forwarding, by the first director, the first message to a second director of the given collection, in response to the given collection not being within the first privacy boundary; and forwarding, by the second director, the first message to a server pool, wherein forwarding the first message to the server pool comprises:
  identifying a first object associated with the given action from a plurality of objects associated with the given collection,
  identifying the server pool associated with the first object, and
  forwarding the first message to the identified server pool.

2. The method of claim 1, wherein the given action comprises initiating a communication session between the first communication device and a second communication device, the second communication device associated with a receiving user.

3. The method of claim 2, wherein the first message specifies a username of the receiving user, the username of the receiving user comprising a local name and the domain name.

4. The method of claim 2, wherein the private data comprises an IP address of the second communication device.

5. The method of claim 1, wherein the given action comprises logging in to the communication system.

6. The method of claim 1, wherein privacy regulations applicable in a region associated with the first privacy boundary prevent the private data from being disclosed outside the region.

7. The method of claim 1, wherein the first message is a Hypertext Transfer Protocol (HTTP) message or a Session Initiation Protocol (SIP) message.

8. The method of claim 1, wherein the method further comprises: storing a mapping that contains entries that map domain names to collections; and wherein identifying the given collection comprises identifying one of the entries that maps the domain name to the given collection.

9. The method of claim 8, further comprising: adding a new entry to the mapping after a new tenant is subscribed to the communication system, the new entry mapping a domain name associated with the new tenant to a collection in the communication system that stores private data regarding people associated with the new tenant.

10. The method of claim 1, wherein the first director is geographically closer to the first communication device than the second director in the communication system.

11. The method of claim 1, wherein the plurality of objects comprises a plurality of people objects, each of the plurality of people objects containing the private data regarding a first set of people.

12. A computing device comprising:
one or more computer-readable storage media that store instructions; and
one or more processing units, the one or more processing units executing the instructions, execution of the instructions by the one or more processing units causing the computing device provide a local director, the local director being associated with a local collection within a privacy boundary of a communication system, the local director causing the computing device to:
  identify a given collection associated with a first domain of a first message, the first message specifying a name of the first domain;
  determine whether the given collection is within the privacy boundary;
  identify first server pool, in response to the given collection being within the privacy boundary, wherein the server pool is associated with the given collection, the server pool is configured to process the first message, wherein identifying the first server pool comprises:
    identifying a first object associated with the first message from a plurality of objects associated with the given collection, and
    identifying the first server pool associated with the first object; and
  forward the first message to the first server pool.

13. The computing device of claim 12,
wherein the first message comprises a request to join a conference; and
wherein the first server pool provides a focus for the conference.

14. The computing device of claim 12, wherein the first server pool have access to private information that is not accessible to server pools outside the privacy boundary.

15. The computing device of claim 14, wherein the private information comprises an Internet Protocol (IP) address of a communication device associated with a given user.

16. The computing device of claim 12,
wherein the computing device receives the first message from a communication device associated with a first user; and
wherein the local director further causes the computing device to forward a second message to a second server pool associated with the given collection within the privacy boundary after the local director receives the second message, the local director receiving the second message from a director of another collection within the communication system.

17. The computing device of claim 12,
wherein the computing device receives the first message from a communication device associated with a first user;
wherein the communication system has a plurality of users, each of the plurality of users having a home server pool, the plurality of users including a first set of users and a second set of users, the first set of users being associated with collections within a first privacy boundary, the second set of users being associated with the collections within a second privacy boundary of the communication system; and
wherein the local director further causes the computing device to identify the home server pool by accessing data that maps the first set of users to their home server pools, the local director not having access to data that maps the second set of users to their home server pools.

18. The computing device of claim 12,
wherein the computing device receives the first message from a communication device associated with a first user, the first message comprising a Session Initiation Protocol (SIP) invitation to invite a second user to join a communication session with the first user, the first message specifying a username of the second user, the username of the second user comprising a local name of the second user and a name of the first domain;

wherein the local director does not have access to data that maps the second user to the server pool when the given collection and the local collection are not both within the privacy boundary; and wherein the local director has access to data that maps the second user to the server pool when the given collection and the local collection are both within the privacy boundary.

19. A communication system comprising:

a plurality of server pools;

a first computing device that executes a first set of instructions, execution of the first set of instructions by the first computing device causing the first computing device to provide a first director, the first director associated with a first collection, the first collection being within a first privacy boundary, the first collection being associated with a first domain, a second computing device that executes a second set of instructions, execution of the second set of instructions by the second computing device causing the second computing device to provide a second director, the second director associated with a second collection, the second collection being within a second privacy boundary, the second collection being associated with a second domain, the second director receiving a first message from a first communication device, the first communication device associated with a first user, the first message comprising an invitation for a second user to join a communication session with the first user, the first message specifying a username of the second user, the username of the second user comprising a local name of the second user and a name of the second domain, the second director using a mapping from domains to collections to identify the first collection as being associated with the first domain, the second director not having access to data that maps the second user to a home server pool of the second user, the second user's home server pool being one of the plurality of server pools, wherein the plurality of server pools are associated with the first collection of the communication system;

the second director forwarding the first message to the first director after determining that the first collection is associated with the first domain;

the first director receiving the first message from the second director;

the first director identifying the second user's home server pool by accessing data that maps users in the first collection to their home pools, wherein identifying the home server pool comprises:

identifying a first object associated with the first message from a plurality of objects associated with the first collection, and identifying the home server pool associated with the first object; and the first director forwarding the first message to the second user's home pool.

20. The communication system of claim 19, wherein the second director receives a second message, the second message specifying a name of the second domain, the second director using the mapping from domains to collections to identify the second collection as being associated with the second domain; and the second director forwarding the second message to one of the server pools.

* * * * *